Patented Feb. 19, 1946

2,395,055

UNITED STATES PATENT OFFICE 2,395,055

ODOR REFINING SULPHATE TURPENTINE

Eugene J. Lorand, Wilmington, Del., assignor to Hercules Powder Company, Wilmington, Del., a corporation of Delaware No Drawing. Application September 7, 1942, Serial No. 457,638

8 Claims. (Cl. 260—675.5)

This invention relates to a method of refining terpinic compounds and, more particularly, relates to a method of odor refining crude sulphate turpentine.

Sulphate turpentine is principally obtained as a by-product in the manufacture of wood pulp cellulose by the sulphate process. The sulphate turpentine is characterized by a vile, sickening odor, which odor is due to the formation of various mercaptans during the delignification of wood. It is well known that this sulphate turpentine is an excellent source of terpenes, especially pinene but because of the extremely pronounced and offensive mercaptan odor, is of little commercial value. Various methods, especially oxidation methods, have been suggested for the refining of compositions containing odor producing compounds, especially mercaptans, but none have been found commercially successful when applied to sulphate turpentine compositions. The use of cadmium sulphide as a catalyst at elevated temperatures and pressures is not satisfactory because the high temperatures cause serious breakdown of the terpenes. Oxidation by means of carefully controlled concentrations of sodium hydroxide is not practical because different mercaptans require different concentration of sodium hydroxide and sulphate turpentine contains several different mercaptans. The use of sodium plumbite (Doctor's solution) long used in the petroleum industry temporarily removes the obnoxious odors but upon distillation, the turpentine reverts to its malodorous state. Air oxidation causes polymerization of the terpene components, resulting in a reduced yield of desired refined material. Other oxidation methods, although being successful in removing the obnoxious odors, contaminate the desired product. Still other oxidation methods only partially remove the obnoxious odor-producing compounds and the removal of mercaptan compounds must be substantially complete since even the smallest trace of these compounds produces a vile and sickening odor.

Now, in accordance with this invention, the method of removing obnoxious odor-producing compounds from sulphate turpentine compositions comprises generally the step of subjecting the crude sulphate turpentine to a metal peroxide treatment, which treatment produces a composition substantially free of obnoxious odor-producing compounds, and which odor-free composition is not contaminated by the treating agents and which composition will not revert to its previous malodorous state regardless of treatments to which the composition may be subsequently subjected.

More specifically, the peroxide refining treatment is carried out on sulphate turpentine which has been fractionated in any suitable fractionating column to cause the removal of the first 3 to 5% of light end material which comprises the most strongly odorous portion. Crude sulphate turpentine which has been fractionally treated in this manner may be referred to hereinafter as "topped" sulphate turpentine. The peroxide treatment may be carried out by adding a persulphate metal salt as, for example, sodium persulphate, potassium persulphate, or ammonium persulphate to a peroxide forming compound as, for example, silver nitrate or a peroxide which may be regenerated by the persulphate, as, for example, silver peroxide. In this manner the operation becomes a continuous one with the persulphate acting to regenerate the peroxide. It has been found that treatment with a metallic peroxide per se will effect substantially the same results as described with respect to the use of a metal peroxide regenerating agent.

The refining operation in accordance with this invention is illustrated by the following examples.

In each example crude sulphate turpentine was

"topped" or fractionated to remove 3-5% of material.

| Ex. | "Topped" sulphate turpentine amount | Persulphate | Amount | Conc. | Peroxide forming agent | Amount | Conc. |
|---|---|---|---|---|---|---|---|
| | Cc. | | | Per cent | | Cc. | Per cent |
| 1 | 1,000 | | | | | | |
| 2 | 2,500 | Potassium | 400 cc | 5 | Silver nitrate | 40 | 5 |
| 3 | 2,300 | ___do___ | 184 cc | 5 | ___do___ | 9.2 | 5 |
| 4 | 1,000 | Ammonium | 69 cc | 5 | ___do___ | 4 | 5 |
| 5 | 1,000 | Sodium | 70 cc | 5 | ___do___ | 4 | 5 |
| 6 | 1,000 | Potassium | 80 cc | 5 | | | |
| 7 | 1,000 | Lithium | 70 cc | 5 | Silver nitrate | 4 | 5 |
| 8 | 1,000 | ___do___ | 70 cc | 5 | | | |
| 9 | 1,000 | Silver | 6 gm | | $H_2O$ | 100 | |
| 10 | 1,000 | Manganese | | | $H_2O$ | 100 | |
| 11 | 1,000 | Potassium | 80 cc | 5 | $Mn(NO_3)_2$ | 10 | 5 |

| Ex. | Peroxide | Amount | Agitation time | Temp. | Refined sulphate specific gravity at 15.6/15.6° C. | Turpentine refractive index at 20° C. | Yield | Remark |
|---|---|---|---|---|---|---|---|---|
| | | Gm. | Hrs. | | | | Per cent | |
| 1 | $Ag_2O_2$ | 3.5 | 4 | Room | Unchanged | Unchanged | 97 | Obnoxious. |
| 2 | | | 3 | ___do___ | From 0.8707 to 0.8716 | From 1.4722 to 1.4718 | 94.8 | Odor removed. |
| 3 | | | 5 | ___do___ | Increased 0.0005 | Unchanged | 97 | Do. |
| 4 | | | 3 | ___do___ | Unchanged | Increased 0.0004 | | Do. |
| 5 | | | 4 | ___do___ | ___do___ | Unchanged | 96 | Do. |
| 6 | $Ag_2O_2$ | 0.2 | 4 | ___do___ | ___do___ | ___do___ | 97 | Do. |
| 7 | | | 3 | ___do___ | ___do___ | ___do___ | 97 | Do. |
| 8 | $Ag_2O_2$ | 0.2 | 4 | ___do___ | ___do___ | ___do___ | 96 | Do. |
| 9 | | | 4 | ___do___ | ___do___ | ___do___ | 97 | Do. |
| 10 | | | 5 | 60-70° C | Increased 0.0010 | Increased 0.0006 | 96 | Do. |
| 11 | | | 5 | 60-70° C | ___do___ | Increased 0.0008 | 95 | Do. |

In each of the foregoing examples the process was carried out in three steps. The first step which may or may not be included in the process of this invention consisted of the removal by means of fractionation of from 3-5% of the materials present in the crude sulphate turpentine. The second step which is essential to the process of this invention consisted of treating the "topped" sulphate turpentine with a peroxide oxidation medium for several hours during constant agitation of the mixture. The third step which is not essential to the process of this invention consisted of subjecting the peroxide treated mixture to a steam distillation operation to remove the refined turpentine from the "heel," the "heel" consisting of a sludge made up principally of high boiling oxidation products.

The peroxide or oxidation treatment of the crude sulphate turpentine is preferably carried out by adding a persulphate metal salt to a peroxide forming compound, the salt acting to regenerate the peroxide which peroxide then selectively oxidizes the odor-producing compounds contained in the crude sulphate turpentine.

Persulphates found suitable in accordance with this invention are the alkaline metal persulphates as, for example, potassium, sodium, lithium, and rubidium; complex alkaline metal persulphate salts as, for example, sodium magnesium, potassium magnesium, potassium zinc, potassium ferrous, etc.; alkaline earth metals as, for example, magnesium, calcium, strontium and barium; metals found in the fourth series under the seventh and eighth group of the periodic chart as manganese, cobalt and nickel; ammonium zinc, ammonium ferrous and ammonium magnesium complex persulphate salts may be used; also, persulphates of cadmium, copper, silver, zinc, nickel and lead are suitable. In general, most of the metals classified under groups 1 and 2 of the periodic chart are found suitable.

It has been found that the metal peroxides act as selective oxidizing agents when they are formed in aqueous solution together with a peroxide-regenerating agent. Desirable peroxides, useful in accordance with this invention, are the heavy metal peroxides and particularly silver peroxide. A preferred manner of forming the peroxide is by the action of a persulphate on a metal salt as, for example, the action of potassium persulphate, or any other water-soluble persulphate on silver nitrate. It is believed that the persulphate reacts with the nitrate in the presence of water to form silver persulphate and potassium nitrate. It is then believed that the silver persulphate reacts with two molecules of water to form silver peroxide and sulphuric acid. The silver peroxide, together with the potassium persulphate which is present in the reaction mixture in a ratio of about 10:1 of the silver nitrate, acts upon the malodorous constituents of the sulphate turpentine and converts it to a non-malodorous state. During this oxidation operation, the peroxide is regenerated as long as an appreciable excess of the persulphate is present. The use of a persulphate in the presence of silver nitrate represents an effective method of forming the peroxide. However, the peroxide may be furnished in the form of a peroxide per se, as, for example, silver peroxide and other metal peroxides as, for example, lead, cobalt, manganese, etc. When the peroxide is formed in situ as represented by the potassium persulphate-silver nitrate method, a more effective catalyst is provided since it is considered to be in a nascent condition when first formed.

The oxidation step may be carried out at a temperature between 0° C. and the reflux temperature of the reaction mixture. However, the preferred or optimum temperature is from about room temperature (20° C.) to about 60° C. The ratio of persulphate to peroxide may vary between 5 to 20 but, preferably, the ratio is 10.

The quantity of oxidizing medium necessary to eliminate the malodorous compounds will depend upon the amount of malodorous compounds present in the crude sulphate turpentine and upon the concentration of the oxidizing medium. The concentration of the oxidizing medium may vary between about 1% to a saturated solution of the components. The preferred concentration of the oxidizing medium will be about 5%. The ratio of crude sulphate turpentine to oxidizing medium, where the oxidizing medium is made up of 5% component solution strengths may be between about 2 and about 10 and is preferably about 5.

The process of oxidation may be controlled by means of the temperature at which the reaction is carried out, by means of the concentration of the components that go to make up the oxidizing medium, the ratio of the components present in the oxidizing medium, and the ratio of the oxidizing medium to the sulphate turpentine. The oxidation step may be carried out under pressure sufficient to prevent loss of turpentine through volatilization or under pressure sufficient to increase the speed of oxidation of the malodorous compounds present in the mixture.

Although the process of refining turpentine in accordance with this invention is adapted especially to the refining of crude sulphate turpentine, the process may also be used to complete the purification of so-called refined turpentine which still contains traces of the very noticeable and very undesirable sulphur odor. The persulphate-peroxide treatment may be made without first "topping" the sulphate turpentine.

In accordance with this invention, a novel method of selectively oxidizing the malodorous components of crude sulphate turpentine has been devised wherein a refined product is obtained in substantially greater yields than heretofore realized by other oxidation methods and which process may be adapted for continuous operation.

What I claim and desire to protect by Letters Patent is:

1. A method of refining sulphate turpentine containing malodorous compounds which comprises treating said turpentine with silver peroxide.

2. A method of refining sulphate turpentine containing malodorous compounds which comprises treating said turpentine with silver peroxide and a persulphate in the presence of at least a small amount of water.

3. A method of refining sulphate turpentine containing malodorous compounds which comprises treating said turpentine with silver peroxide at a temperature between about 0° C. and the reflux temperature of the turpentine reaction mixture.

4. A method of refining sulphate turpentine containing malodorous compounds which comprises treating said turpentine with silver peroxide at a temperature between about 20° C. and about 60° C.

5. A method of refining sulphate turpentine containing malodorous compounds which comprises treating said turpentine with silver peroxide formed in the turpentine by the interaction of a silver salt and a persulphate in the presence of at least a small amount of water.

6. A method of refining sulphate turpentine containing malodorous compounds which comprises treating said turpentine with silver peroxide formed in the turpentine by the interaction of a silver salt and a persulphate in the presence of at least a small amount of water, the said treatment being carried out at a temperature between about 0° C. and the reflux temperature of the turpentine reaction mixture.

7. A method of refining sulphate turpentine containing malodorous compounds which comprises treating said turpentine with silver peroxide formed in the turpentine by the interaction of silver nitrate and potassium persulphate in the presence of at least a small amount of water, the said treatment being carried out at a temperature between about 0° C. and the reflux temperature of the turpentine reaction mixture.

8. A method of refining sulphate turpentine containing malodorous compounds which comprises fractionally distilling said turpentine to remove from about 3% to about 5% light end material, treating the residual turpentine with silver peroxide formed in the turpentine by the interaction of silver nitrate and potassium persulphate in the presence of at least a small amount of water, the said treatment being carried out at a temperature between about 0° C. and the reflux temperature of the turpentine reaction mixture, and steam distilling the treated turpentine.

EUGENE J. LORAND.